United States Patent

[11] 3,585,348

| [72] | Inventor | Horst Eckstein |
| | | Grevenbroich, Germany |
| [21] | Appl. No. | 458,829 |
| [22] | Filed | May 13, 1965 |
| [45] | Patented | June 15, 1971 |
| [73] | Assignee | W. C. Heraeus GmbH |
| | | Hanau, Germany |
| [32] | Priority | Oct. 3, 1961 |
| [33] | | Germany |
| [31] | | H43,763 |
| | | Continuation of application Ser. No. 226,029, Sept. 25, 1962, now abandoned. |

[54] METHOD AND APPARATUS FOR WELDING METALLIC AND NONMETALLIC MATERIALS BY AN ELECTRON BEAM UNDER NORMAL PRESSURE
14 Claims, 1 Drawing Fig.

[52] U.S. Cl. ................................................. 219/121EB
[51] Int. Cl. .................................................... B23k 15/00
[50] Field of Search .......................................... 219/121
EB, 117, 74, 125; 250/49.5

*Primary Examiner*—J. V. Truhe
*Assistant Examiner*—R. E. O'Neill
*Attorney*—Klein and Padlon ABSTRACT: A method and apparatus for electron beam welding metalic or nonmetallic materials under a normal pressure. Inert gas envelopes the beam at the point of beam emission and covers the front, rear, or both sides of the workpiece at the point of beam impingement.

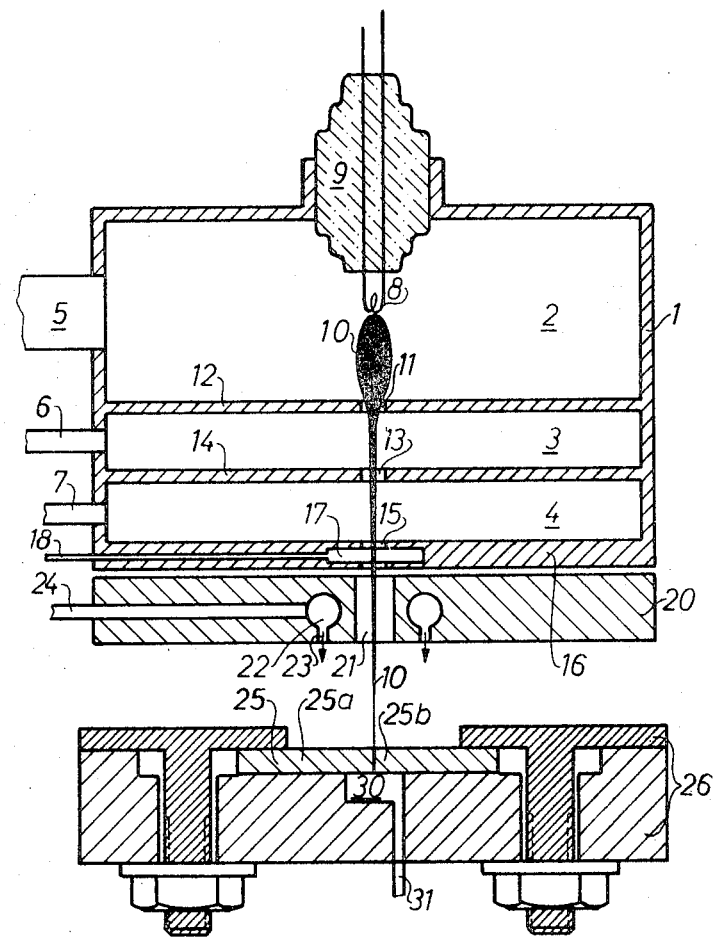

METHOD AND APPARATUS FOR WELDING METALLIC AND NONMETALLIC MATERIALS BY AN ELECTRON BEAM UNDER NORMAL PRESSURE

This is a continuation of pending application Ser. No. 226,029 filed Sept. 25, 1962, now abandoned.

The present invention relates to a method and an apparatus for welding metallic or nonmetallic materials by means of an electron beam under a normal pressure.

It is already known that electron beams may be produced in a vacuum and be employed for carrying out welding operations likewise under a vacuum. The apparatus which are used for this purpose permit thin as well as thick metallic or nonmetallic workpieces to be welded together without requiring the application of welding flux or filler material. Highly refined metals which have been purified, for example by being melted under a pressure of less than $10^{14}$ mm. Hg may also be excellently welded electron beams under the same pressure at which they were melted. This is due to the fact that, after once being melted under a vacuum, the metals will no longer release any gases which might lead to the formation of pores during the welding process. The welding seams attained will therefore be free of pores.

Different conditions prevail if metals which were not produced by being melted under a vacuum are to be welded by electron beams under a vacuum. Some of the gases which are occluded in the metal are then freed from the workpiece and leave the welding area under a spray of small metal particles, while the remainder of the gases which cannot escape as quickly because of the short period during which the metal is melted during the welding process expand in accordance with the low pressure which is applied thereon. When the metal subsequently solidifies, these gases are frozen-in the form of larger gas bubbles. The welding seams which are then attained are permeated by large pores which is very detrimental to the solidity of the weld, as may be easily ascertained by strength and bending tests.

A further disadvantage of welding under a vacuum consists in the great expense for the required machinery and appliances for clamping the workpieces to be welded and for moving the same within a vacuum vessel which has to be of very large size to permit such movements. Obviously, if very large workpieces have to be welded, for example, the wings of airplanes, this welding method cannot be applied at all since it would be practically impossible to build and operate a vacuum vessel of such dimension.

It is therefore evident that there is a great need for a method which permits a proper welding seam to be produced which does not contain any large gas bubbles, and which method may be carried out by means of a relatively small and inexpensive apparatus. On degassed materials this may be attained if the welding operation is carried out under normal atmospheric pressure. This requires the electron beam to be passed out of its evacuated generating chamber to the atmospheric outside which is preferably done through an aperture and several pressure stages since only in this manner is it possible to attain the required beam and energy concentration. Such apparatus are generally called "electron generators." They also form the basis of the present invention. In these apparatus an electron beam is produced under a vacuum and shot through several pressure stages into the atmosphere or into high pressure chambers. In this manner it is possible, for example, to accelerate electrons by employing voltages up to 200 kv. and to pass them into the atmosphere through an outlet nozzle of a diameter of 0.3 to 1 mm. Electron beams of 20 ma. and more may thus be produced. In order to protect the outlet nozzle from impurities, an inert gas is frequently passed into the first chamber so that the pressure in this chamber at least equals the pressure in the chamber in which the electron beam is applied for the welding operation. The outlet nozzle is then flushed by an inert gas current which, however, is not sufficient for also protecting the workpiece from oxidizing or even burning during the welding process. Such oxidation also occurs in the known arc-welding method and therefore the electrode supports as used in this method have already been provided with means for supplying an inert gas. There is also a known method, the so-called "Arcatom" method, of welding in such a gas by means of an arc. This method has been used, for example, for welding structural parts of steel. In more recent times, however, the problem occurs more and more frequently that high melting metals such as zircon, special high-grade types of steel and similar materials should be welded. For these purposes, the known welding methods are useless since they do not permit the required purity of foreign substances and oxides to be attained.

It is therefore an object of the present invention to provide a method of welding metallic or nonmetallic materials under a normal pressure by means of an electron beam and by supplying an inert gas for the purpose of covering the front or rear or both sides of the workpiece at the point where the welding is being carried out. The inert gas is preferably supplied to the front side of the workpiece through an annular channel which surrounds the electron beam and then through an annular outlet from this channel which extends parallel to the direction of the beam. At the rear side of the workpiece, the clamping fixture on which the workpiece is mounted is likewise provided with a channel through which the inert gas is supplied to the area around the welding point.

The distance between the outlet nozzle for the electron beam and the workpiece should preferably not be larger than 10 mm. since the electrons while passing through liberated metal vapors and gases might otherwise be too much retarded and scattered before impinging upon the workpiece.

As an example it may be stated that a super-refined steel plate of a thickness of 2 mm. will be perfectly welded through at a feeding speed of 30cm./min. by means of an accelerating voltage of 90 kv. and an electron beam of 7.4 ma. A migrograph of a ground section of the welding seam shows at the center of the seam a definite constriction as compared with the entry and outlet points of the electron beam. This is probably due to the fact that at the inside of the workpiece a positive ion sleeve is formed around the electron beam which results in a concentration of the beam similarly as it occurs with thread beams.

The accompanying drawing illustrates diagrammatically a central vertical section of one preferred embodiment of the invention.

In this drawing, the electron generator consists of a housing 1 which contains three chambers 2, 3, and 4 which are continuously evacuated by vacuum lines 5, 6, and 7, respectively and which contain pressures of, for example, approximately $10^{14}$ $10^{12}$ and 1 mm. Hg, respectively.

The first chamber 2 contains the heating filament 8 which produces the electrons and carries a potential of, for example, −90 kv. relative to the grounded housing 1. For being properly insulated, filament 8 is inserted into an insulator 9 which preferably consists of a ceramic material. The electron beam 10 is concentrated by electrostatic or magnetic means of a conventional type, not shown, and it passes successively through an aperture 11 in the partition 12 and an aperture 13 in the partition 14. The electron beam 10 then passes through the outlet aperture 15 in the front wall 16 into the outer atmosphere. It is advisable to provide this front wall 16 with a small chamber 17 which is supplied through a line 18 with an insert gas or with the air which is drawn out of the chambers 2, 3, and 4. The pressure which is provided in this small chamber 17 is equal to or slightly higher than the outer pressure in order to prevent the entry of dust or undesirable vapors into the chambers 2, 3, and 4. The outer pressure may be the atmospheric pressure or it may be varied in accordance with the metal to be welded and the temperature required therefor.

The electron generator as such, as illustrated in the drawings, is of the conventional type of construction. However, on the outer side of its front wall 16 an additional element 20 is mounted, for example, by being bolted thereto.

For the free passage of the electron beam 10, this element 20 is provided with an aperture 21 which is coaxial with the apertures 11, 13, and 15. At its inside and concentrically around the aperture 21, element 20 is further provided with an annular channel 22 which has an annular outlet slot 23 through which an inert gas, for example, argon or helium, which is supplied through a line 24 may be discharged in the direction toward a workpiece 25 in a manner so as to surround the electron beam 10 completely and prevent any access of air, oxygen, and detrimental vapors to its point of impact on the workpiece 25.

In the particular embodiment of the invention as illustrated in the drawing, the workpiece 25 consists of two parts 25a and 25b which are to be welded together by the electron beam 10 and are for this purpose mounted in the proper position relative to each other by a clamping fixture 26. At the rear side of the workpiece 25 around the welding point or welding seam this clamping fixture contains a channel 30 which is likewise supplied through a line 31 with an insert gas for protecting the rear side of the weld from oxidizing as the result of the heat caused by the electron beam 10.

If workpieces of very large dimensions are to be welded, the method and apparatus according to the invention permit such a workpiece to be mounted in a fixed position, while the welding apparatus is moved relative to the workpiece. All of the difficulties of providing and operating work-moving means within high-vacuum chambers are therefore completely avoided.

Although my invention has been illustrated and described with reference to the preferred embodiment, thereof, I wish to have it understood that it is in no way limited to the details of such embodiment, but is capable of numerous modifications within the scope of the appended claims.

Having thus fully disclosed my invention, what I claim is:

1. In the method of performing a work function on a workpiece with an electron beam in a gaseous environment at or near atmospheric pressure, the steps of generating and propagating the beam in a high vacuum environment having a pressure of the order of $10^{14}$ mm. Hg, directing and passing the beam from said high vacuum environment through a plurality of intermediate regions of progressively increased pressure, thence through a gaseous region of helium shield gas at or above atmospheric pressure, and thence to the workpiece through the surrounding helium shield gas emitted from said gaseous region, and separately pumping said intermediate regions to maintain predetermined pressures therein.

2. The method of welding a workpiece by means of an electron beam which comprises: mounting a workpiece to be welded in a space of normal atmospheric pressure; providing an electron beam generator, having a vacuum chamber in which the pressure therein is maintained at approximately $10^{14}$ mm. Hg and another chamber in which the pressure therein is maintained at a subatmospheric pressure higher than the pressure in said vacuum chamber; mounting said generator above said workpiece in vertically spaced relation thereto; generating an electron beam in said vacuum chamber; projecting said beam out from said vacuum chamber through said another chamber and against said work piece; emitting a stream of inert gas into the space between said generator and said work piece from a gas source chamber spaced and isolated from said space wherein said workpiece is mounted, said stream of inert gas at the point of emission being directed into said space containing said workpiece and enveloping said electron beam for covering the area of said workpiece to be welded by the impact of said electron beam thereon.

3. The method of welding a workpiece by means of an electron beam as defined by claim 2 which includes the applying of a layer of inert gas to the area on the underside of said workpiece opposite the point of impact of said electron beam with said workpiece.

4. The method of welding a workpiece by means of an electron beam which comprises: mounting a workpiece to be welded in a space of normal atmospheric pressure; providing an electron beam generator having a vacuum chamber, a gas chamber, and an intermediate chamber interposed between said vacuum chamber and said gas chamber, and vertically aligned inlet and outlet apertures into and out of said intermediate and gas chambers; mounting said generator above said workpiece in vertically spaced relation thereto; maintaining the pressure in said vacuum chamber at approximately $10^{14}$ mm. Hg and the pressure in said intermediate chamber at a subatmospheric pressure higher than the pressure in said vacuum chamber; generating an electron beam in said vacuum chamber and projecting it out therefrom through said intermediate chamber and said gas chamber and against said workpiece; constantly supplying an inert gas to said gas chamber at or above atmospheric pressure and discharging it therefrom through the outlet aperture thereof to provide a stream of inert gas in the space between said generator and said workpiece, said stream of inert gas enveloping said electron beam and covering the area of said workpiece to be welded by the impact of said electron beam thereon.

5. The method of welding a workpiece by means of an electron beam as defined by claim 4 which includes the applying of a layer of inert gas to the area on the underside of said workpiece opposite the point of impact of said electron beam with said workpiece.

6. An apparatus for welding a workpiece which is disposed in a space of normal atmospheric pressure by means of an electron beam, said apparatus comprising: an electron beam generator having a vacuum chamber and another chamber, means by which the pressure in said vacuum chamber is maintained at approximately $10^{14}$ mm. Hg and the pressure in said another chamber is maintained at a subatmospheric pressure higher than the pressure in said vacuum chamber, said generator being adapted to be mounted above said workpiece in vertically spaced relation thereto; means by which an electron beam is generated in said vacuum chamber and projected out therefrom through said another chamber and against said workpiece; and a gas source chamber means spaced and isolated from said space wherein said workpiece is disposed, said gas source chamber means emitting and maintaining a stream of inert gas in the space between said generator and said workpiece, said stream of inert gas enveloping said electron beam at the point of emission and covering the area of said workpiece to be welded by the impact of said electron beam thereon.

7. An apparatus for welding a workpiece which is disposed in a space of normal atmospheric pressure by means of an electron beam, said apparatus comprising; an electron beam generator having a vacuum chamber, a gas chamber and an intermediate chamber interposed between said vacuum chamber and said gas chamber, said intermediate and gas chambers being provided with vertically aligned inlet and outlet apertures; means by which the pressure in said vacuum chamber is maintained at approximately $10^{14}$ mm. Hg and the pressure in said intermediate chamber is maintained at a subatmospheric pressure higher than the pressure in said vacuum chamber; said electron beam generator being adapted to be mounted above said workpiece in vertically spaced relation thereto; means by which an inert gas is constantly supplied to said gas chamber at or above atmospheric pressure and discharged therefrom through the said outlet aperture thereof to provide a stream of inert gas between said generator and the surface of said workpiece to be welded; and means by which an electron beam is generated in said vacuum chamber and projected out therefrom through said intermediate chamber, said gas chamber, and said stream of inert gas against the said surface of said workpiece to be welded.

8. An apparatus for welding a workpiece under normal atmospheric pressure by means of an electron beam, said apparatus comprising; a clamping fixture for mounting a workpiece to be welded in fixed position in a space of normal atmospheric pressure; an electron beam generator which is adapted to be mounted above and in vertically spaced relation to a workpiece which is mounted in said clamping fixture; said generator comprising a housing having a vacuum chamber and another chamber confined therein, and a bottom wall, means by which the pressure in said vacuum chamber is maintained at approximately $10^{14}$ mm. Hg and the pressure in said another chamber is maintained at a subatmospheric pressure higher than the pressure in said vacuum chamber, an aperture in said bottom wall, means by which an electron beam is generated in said vacuum chamber and projected out therefrom through said another chamber and through said aperture against a workpiece mounted in said clamping fixture; and means providing and maintaining a stream of inert gas between said generator and the said workpiece which stream envelopes said electron beam and covers the area of said workpiece to be welded; said means comprising, an annular discharge slot formed in said bottom wall about said aperture and concentric therewith, and means by which an inert gas is constantly supplied to said slot at or above atmospheric pressure and discharged therefrom toward said workpiece.

9. An apparatus for welding a workpiece under normal atmospheric pressure as defined by claim 8 in which the upper surface of said clamping fixture is provided with a chambered recess which is open at the upper end thereof and is adapted to be closed by a workpiece mounted in said fixture, and means through which an inert gas is supplied to said chambered recess.

10. An apparatus for welding a workpiece which is disposed in a space of normal atmospheric pressure by means of an electron beam, said apparatus comprising; an electron beam generator which is adapted to be mounted above and in vertically spaced relation to a workpiece to be welded; said generator comprising a housing having a vacuum chamber and another chamber defined therein, and a bottom wall, means by which the pressure in said vacuum chamber is maintained at approximately $10^{14}$ mm. Hg and the pressure in said another chamber is maintained at a subatmospheric pressure higher than the pressure in said vacuum chamber, an aperture in said bottom wall, means by which an electron beam is generated in said vacuum chamber and projected out therefrom through said another chamber and through said aperture against a workpiece to be welded which is disposed below said generator in vertically spaced relation thereto; and means providing and maintaining a stream of inert gas between said generator and the said workpiece which stream envelopes said electron beam and covers the area of the said workpiece which is to be welded; said means comprising an annular discharge slot formed in said bottom wall about said aperture and concentric therewith, and means by which an inert gas is constantly supplied to said slot at or above atmospheric pressure and discharged therefrom toward said workpiece.

11. An apparatus for welding a workpiece disposed in a space of normal atmospheric pressure by an electron beam, said apparatus including an electron beam generator which is adapted to be mounted above a workpiece to be welded in vertically spaced relation thereto; said generator comprising a vacuum chamber and another chamber, means by which the pressure in said vacuum chamber is maintained at approximately $10^{14}$ mm. Hg and the pressure in said another chamber is maintained at a subatmospheric pressure higher than the pressure in said vacuum chamber, means in said vacuum chamber by which an electron beam is generated in said vacuum chamber and projected out therefrom through said another chamber and against a workpiece which is disposed below said generator in vertically spaced relation thereto, and means by which a stream of inert gas is constantly projected out from said generator at or above atmospheric pressure around said electron beam and into engagement with the surface of said workpiece surrounding the point of impact of the said electron beam therewith.

12. The method of welding a workpiece by means of an electron beam which comprises: disposing a workpiece to be welded in a space of normal atmospheric pressure, mounting an electron beam generator above said workpiece in vertically spaced relation thereto, projecting an electron beam generated in said generator out therefrom against said workpiece, emitting a stream of inert gas between said generator and said workpiece from a gas source chamber spaced and isolated from said space wherein said workpiece is disposed, said inert gas from said gas source chamber at the point of emission enveloping said electron beam and encompassing the area of said workpiece about the point of impact of said electron beam with said workpiece.

13. An apparatus for welding a workpiece which is disposed in a space of normal atmospheric pressure by means of an electron beam said apparatus comprising: an electron beam generator which is mounted above said workpiece in vertically spaced relation thereto and is operative to generate and project an electron beam out therefrom against said workpiece, and a gas source chamber means spaced and isolated from said space wherein said workpiece is disposed, said gas source chamber means emitting and maintaining between said generator and said workpiece a stream of inert gas which envelopes said beam at the point of emission and encompasses the area of said workpiece about the point of impact of said beam with said workpiece.

14. The method of welding a workpiece by means of an electron beam, comprising arranging a workpiece to be welded in a space of normal atmospheric pressure, producing an electron beam in a vacuum chamber, directing said beam through an outlet aperture from said vacuum chamber into another chamber, maintaining the pressure in said another chamber at a subatmospheric pressure which is higher than the pressure in said vacuum chamber, projecting said beam through a discharge aperture from said another chamber against the said workpiece disposed in said space in front of said discharge aperture, providing and maintaining a stream of inert gas in the space between said discharge aperture and said workpiece, said stream of inert gas enveloping said beam and covering the area of said workpiece surrounding the point of impact of said beam with said workpiece.

UNITED STATES PATENT OFFICE
CERTIFICATE OF CORRECTION

Patent No. 3,585,348      Dated June 15, 1971

Inventor(s) Horst Eckstein

It is certified that error appears in the above-identified patent and that said Letters Patent are hereby corrected as shown below:

On the cover sheet, [73] "W. C. Heraeus GmbH Hanau, Germany" should read -- Leybold-Heraeus GmbH & Co., Koln-Bayental, Germany --.

Signed and sealed this 22nd day of February 1972.

(SEAL)
Attest:

EDWARD M. FLETCHER, JR.       ROBERT GOTTSCHALK
Attesting Officer      Commissioner of Patents

UNITED STATES PATENT OFFICE
CERTIFICATE OF CORRECTION

Patent No. 3,585,348          Dated June 15, 1971

Inventor(s) Horst Eckstein

It is certified that error appears in the above-identified patent and that said Letters Patent are hereby corrected as shown below:

Column 1, line 17; column 3, lines 40 and 52; column 4, lines 8, 31 and 54; column 5, lines 4 and 34; column 6, line 2: "$10^{14}$" should read -- $10^{-14}$ --; column 2, line 51, should read: -- $10^{-4}$, $10^{-2}$ and 1 mm Hg, respectively. --

Signed and sealed this 19th day of December 1972.

(SEAL)
Attest:

EDWARD M. FLETCHER, JR.
Attesting Officer

ROBERT GOTTSCHALK
Commissioner of Patents